United States Patent
Dye

(10) Patent No.: US 11,764,018 B2
(45) Date of Patent: Sep. 19, 2023

(54) SYSTEM OF FOUR WAY AUTOMATIC TRANSFER SWITCHES

(71) Applicant: Cummins Power Generation IP, Inc., Minneapolis, MN (US)

(72) Inventor: Brian G. Dye, Eden Prairie, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 0 days.

(21) Appl. No.: 17/581,592

(22) Filed: Jan. 21, 2022

(65) Prior Publication Data

US 2022/0148835 A1 May 12, 2022

Related U.S. Application Data

(62) Division of application No. 16/202,077, filed on Nov. 27, 2018, now Pat. No. 11,244,799.

(51) Int. Cl.
| | |
|---|---|
| *H01H 50/54* | (2006.01) |
| *H01H 50/18* | (2006.01) |
| *H01H 50/36* | (2006.01) |
| *H01H 50/60* | (2006.01) |
| *H01H 50/00* | (2006.01) |

(Continued)

(52) U.S. Cl.
CPC ............ *H01H 50/541* (2013.01); *H01H 9/40* (2013.01); *H01H 50/002* (2013.01); *H01H 50/18* (2013.01); *H01H 50/36* (2013.01); *H01H 50/60* (2013.01); *H02J 9/06* (2013.01); *H02J 9/062* (2013.01); *H01H 2050/362* (2013.01); *H01H 2225/008* (2013.01); *H01H 2300/018* (2013.01)

(58) Field of Classification Search
CPC ...... H01H 50/541; H01H 9/40; H01H 50/002; H01H 50/18; H01H 50/36; H01H 50/60; H02J 9/06; H02J 9/062
See application file for complete search history.

(56) References Cited

U.S. PATENT DOCUMENTS

| | | |
|---|---|---|
| 3,621,108 A | 11/1971 | Cleaveland |
| 7,599,171 B1 | 10/2009 | Remmert |
| 7,649,149 B2 | 1/2010 | Mikkelsen |

(Continued)

OTHER PUBLICATIONS

International Search Report and Written Opinion issued in International Application No. PCT/US2019/063149 dated Feb. 12, 2020.

*Primary Examiner* — Bernard Rojas
(74) *Attorney, Agent, or Firm* — Foley & Lardner LLP

(57) ABSTRACT

A system includes a first group of cassettes, each cassette including a first stationary bar, a first plurality of fixed contact members, and a first plurality of movable contact members, each of which is electrically coupled and rotatably connected to the first stationary bar and configured to contact one of the first plurality of fixed contact members. The system includes a second group of cassettes each including a second stationary bar, a second plurality of fixed contact members, and a second plurality of movable contact members, each of which is electrically coupled and rotatably connected to the second stationary bar and configured to contact one of the second plurality of fixed contact members. The system includes at least one operating mechanism to control opening and closing of the movable contact members. The first stationary bar is coupled to the second stationary bar.

20 Claims, 5 Drawing Sheets

(51) Int. Cl.
*H02J 9/06* (2006.01)
*H01H 9/40* (2006.01)

(56) References Cited

U.S. PATENT DOCUMENTS

| | | | |
|---|---|---|---|
| 8,471,659 B1 | 6/2013 | Flegel | |
| 8,779,309 B2 | 7/2014 | Flegel | |
| 10,163,585 B2 * | 12/2018 | Zhou | H01H 77/10 |
| 2003/0155330 A1 | 8/2003 | Rademacher et al. | |
| 2017/0103865 A1 * | 4/2017 | Ji | H01H 50/644 |
| 2017/0117104 A1 | 4/2017 | Zhou et al. | |
| 2017/0117747 A1 | 4/2017 | Zhou et al. | |
| 2018/0088177 A1 * | 3/2018 | Yan | H01H 11/0062 |

* cited by examiner

SYSTEM OF FOUR WAY AUTOMATIC TRANSFER SWITCHES

CROSS-REFERENCE TO RELATED APPLICATIONS

This application is a divisional of U.S. patent application Ser. No. 16/202,077, filed Nov. 27, 2018, the contents of which are incorporated herein in their entirety by reference.

FIELD

The present disclosure relates to automatic transfer switches.

BACKGROUND

An automatic transfer switch (ATS) is used to switch an electric load back and forth between power sources (e.g., a primary power source, such as a utility grid, and a secondary power source, such as a generator). More specifically, an automatic transfer switch allows for transferring power from one or more sources to a load. A transfer of the load from a primary source to a secondary source happens, for example, when the primary source experiences a power outage or other failure. When the power outage is over, the automatic transfer switch switches the power source from the secondary source back to the primary source.

SUMMARY

An embodiment of the disclosure relates to a system. The system includes a first group of one or more cassettes. Each cassette of the first group of cassettes includes a first stationary bar, a first plurality of fixed contact members, and a first plurality of movable contact members. Each of the first plurality of movable contact members is electrically coupled and rotatably connected to the first stationary bar and configured to contact one of the first plurality of fixed contact members. The system further includes a second group of one or more cassettes. Each cassette of the second group of cassettes includes a second stationary bar, a second plurality of fixed contact members, and a second plurality of movable contact members. Each of the second plurality of movable contact members is electrically coupled and rotatably connected to the second stationary bar and configured to contact one of the second plurality of fixed contact members. The system additionally includes at least one operating mechanism configured to control opening and closing of the first plurality of movable contact members and the second plurality of movable contact members, and for each cassette of the first group of cassettes, a coupling configured to couple the first stationary bar of the cassette of the first group of cassettes to the second stationary bar of a cassette of the second group of cassettes.

Another embodiment relates to a method. The method includes coupling a first group of cassettes to a second group of cassettes. Each cassette of the first group of cassettes and the second group of cassettes includes a source bar structured to connect to a corresponding power source, and at least one movable bar electrically coupled and rotatably connected to a stationary bar. The method includes directing current to flow through the stationary bar and at least one movable bar of each cassette of the first group of cassettes or the second group of cassettes so as to induce an electromagnetic force, and causing the electromagnetic force to act on at least one movable bar of each cassette of the first group of cassettes or the second group of cassettes so as to move at least one movable bar toward the source bar of each cassette of the first group of cassettes or the second group of cassettes. The coupling includes connecting a stationary bar of the first group of cassettes to a stationary bar of the second group of cassettes.

Yet another embodiment relates to a system comprising an automatic transfer switch. The automatic transfer switch includes a stationary bar having a first end and a second end parallel to the first end; a first source bar and a second source bar disposed on a first side of the stationary bar; a third source bar and a fourth source bar disposed on a second side of the stationary bar that is opposed to the first side; a first movable bar electrically coupled and rotatably connected to the stationary bar at the first side and configured to contact the first source bar; and a second movable bar electrically coupled and rotatably connected to the stationary bar at the first side and configured to contact the second source bar. The switch further includes a third movable bar electrically coupled and rotatably connected to the stationary bar at the second side and configured to contact the third source bar, and a fourth movable bar electrically coupled and rotatably connected to the stationary bar at the second side and configured to contact the fourth source bar.

An additional embodiment relates to a system including an automatic transfer switch cassette. The automatic transfer switch cassette includes a stationary bar and four source bars, each of the four source bars disposed on a same side of the stationary bar. The automatic transfer switch cassette further includes four movable bars. Each of the four movable bars is electrically coupled and rotatably connected to the stationary bar and configured to contact one of the four source bars.

These and other features, together with the organization and manner of operation thereof, will become apparent from the following detailed description when taken in conjunction with the accompanying drawings.

DETAILED DESCRIPTION

Figure 1:
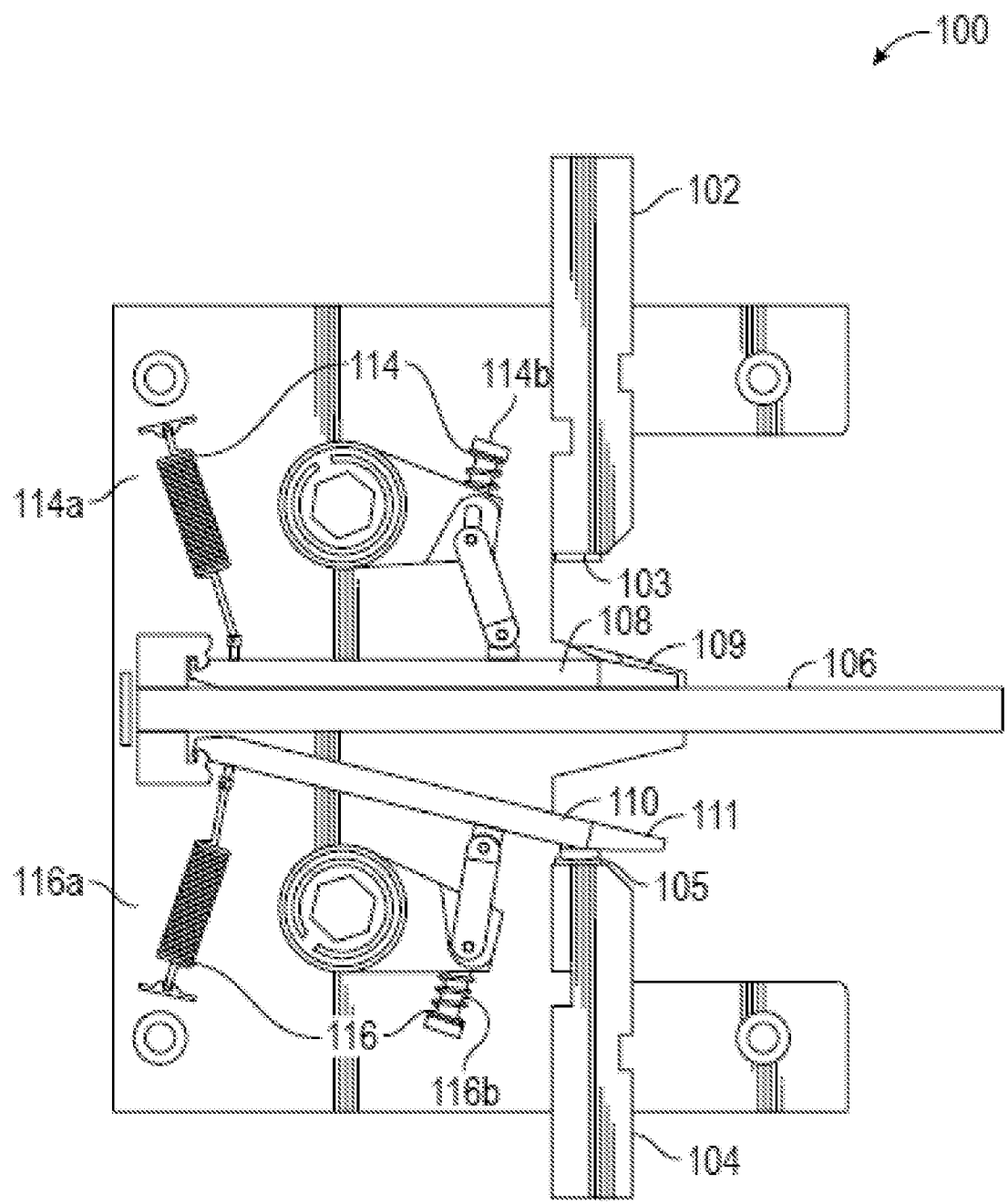
FIG. 1 is a schematic diagram of an automatic transfer switch cassette.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In some situations, automatic transfer switches are coupled together to serve various purposes. For example, automatic transfer switches are often coupled in a "bypass" configuration for critical power installations. In the bypass configuration, two or more automatic transfer switches are coupled in parallel and driven by a common controller. If one automatic transfer switch fails or needs maintenance, it can be automatically bypassed by the other automatic transfer switches or manually bypassed.

When multiple automatic transfer switches are coupled together, the space needed to accommodate the automatic transfer switches may increase substantially. For example, each automatic transfer switch may be provided in its own enclosure rather than a common enclosure, increasing the overall footprint (space needed to accommodate the system). Additionally, when multiple automatic transfer switches are coupled together, a large extent of electrical conduits runs may be needed for connecting the automatic transfer switches in their respective enclosures. In particular, electrical conduits are needed when 'daisy chaining' multiple automatic transfer switches together.

Further still, the individual automatic transfer switches cannot be readily connected in parallel. In addition to each automatic transfer switch having its own enclosure, as mentioned above, each automatic transfer switch may also have its own actuator and controller, which, together with the multiple separate enclosures, collectively enlarge the overall footprint, make coordination of the switches complex, and increase the cost and amount of equipment needed.

Automatic transfer switches generally switch an electrical load between two power sources. A typical configuration is a local load that is being switched between a utility grid that is used as a power source and a backup generator, such as during a power failure. If more than two sources are available to be switched between or coupled in parallel, each additional source requires another ATS switch and associated control to allow it to be utilized and switched in to power the load. In particular, typical approaches require using two automatic transfer switches to route power from one of three sources to a load, each of which has a separate dedicated controller. Generalized, for N sources, it is common to need to utilize N-1 ATS switches, requiring the ATS switches to be configured in either a pyramid or daisy chain configuration to couple or switch between the N sources.

When the ATS switches are configured in pyramid configuration, the load output of each individual ATS switch is coupled to a source input of an ATS switch in the layer above it and each of its source inputs are coupled to the load outputs of two other ATS switches in the layer below. The first layer of ATS switches are coupled to the N sources, and the load is coupled at a final ATS switch at the load output connection at the top of the configuration. Alternatively, in a daisy chain configuration, one source input of each ATS switch of the daisy chain is coupled to one of the N sources, with the load output coupled to an input for the next ATS switch above it in the chain, and the remaining source input coupled to the load output of the next ATS below it in the chain. The first ATS switch in the chain has two sources coupled to its source inputs and the load output of the final ATS switch in the chain is coupled to the load.

For at least these reasons, it is desirable to provide an automatic transfer switch allowing for efficiently coupling to and transferring electrical power from multiple sources (e.g., four sources) to a load, either singly or coupling two or more sources in parallel, within a common enclosure. In particular, it is advantageous to provide a system with one enclosure, within which a switch allows for switching from three or four or more sources to a load.

Exemplary embodiments disclosed herein allow for connecting three or four sources to one load, within a single enclosure, and may employ a single dedicated automatic transfer switch controller. Furthermore, such embodiments may also allow for paralleling of any of two or more electrical sources (e.g., a utility, a solar power source, an energy storage device, a wind power source, and/or any other source of electrical power either directly or via an energy conversion device such as an inverter).

In at least one embodiment, a system includes multiple groups of cassettes. Each group of cassettes has one or more cassettes in it. Each cassette or cassette group has two source inputs (first and second source poles) and a central stationary load contact bar. Two movable contact members then connect between the source input poles and the stationary load contact bar. The two groups of cassettes with two source inputs each then have their stationary load contact bars jumpered together to form a single common output, while upper and lower rotating actuation cross bars are also split left/right to drive the upper and lower movable contact arms in each group of cassettes. Each input/output group of cassettes can also have multiple sub-groups in them, each handling a different phase of the connection (one, two, three, or more, with or without the neutral).

Further, in at least one embodiment, a system includes a first group of one or more cassettes, or a single cassette and an accompanied solid busbar, and a second group of at least one or more cassettes, or a single cassette and an accompanied solid busbar. The first group of cassettes includes a first plurality of movable contact members, a first plurality of fixed contact member, and a first stationary bar. The second group of cassettes includes a second plurality of movable contact members, a second plurality of fixed contact members, and a second stationary bar. The system further includes a first operating mechanism and a second operating mechanism to control opening and closing of the plurality of movable contact members; and a coupling configured to couple an output of the first group of cassettes to an output of the second group of cassettes.

Referring to FIG. 1, a schematic diagram of an automatic transfer switch (ATS) cassette 100 is shown. The ATS shown in FIG. 1 is described in more detail in U.S. Patent App. Publication No. 2017/0117104, entitled "Low Profile Blow-On Force Automatic Switch," published Apr. 27, 2017, the entirety of which is hereby incorporated by reference for the technical disclosures and background therein.

ATS cassette 100 includes a first source bar 102 with a first source contact pad 103, a second source bar 104 with a second source contact pad 105, a stationary bar 106, a first movable bar 108 with a first movable contact pad 109, a second movable bar 110 with a second movable contact pad 111, a first spring and mechanical linkage 114, and a second spring and mechanical linkage 116. As seen in FIG. 1, the movable contact bars 108, 110 are provided at a first location and a second location, respectively. In some embodiments, the first source bar 102 and the second source bar 104 are fixed on the cassette 100. The first source bar 102 may be connected to a primary power source (not illustrated in the present figure), for example, a utility grid.

The second source bar 104 may be coupled to a secondary power source (not illustrated in the present figure), for example, a generator set (also referred to as a "genset"). In some embodiments, the secondary power source may be any other electrical power source.

In some embodiments, the stationary bar 106 is also fixed on the cassette 100. The stationary bar 106 may be coupled to an electrical load (not illustrated in the present figure), for example, a resistive load and/or a motor load. The load to which bar 106 may be connected may include, but is not limited to, appliances, lights, or other loads desirable to power in the event of a utility grid failure. In some embodiments, stationary bar 106 is a T-shaped bar, also referred to as a T-joint.

The first movable bar 108 and the second movable bar 110 are each electrically coupled and rotatably connected to the stationary bar 106. The first and second movable bars 108 and 110 each rotate between a closed position and an open position. As used herein, the "closed position" refers to the situation in which the movable bar engages the corresponding source bar of the power source that supplies power. The "open position" refers to the situation in which the movable bar disengages the corresponding source bar of the power source that is disconnected from the load. When power is being supplied from the primary power source, the first movable contact pad 109 at an end of the first movable bar 108 engages the first source contact pad 103 at an end of the first source contact 102.

The first movable bar 108 is in the closed position and the electrical load is electrically connected to the primary power source. When there is an interruption in the primary power source, the first movable bar 108 rotates from the closed position to the open position to disengage the first movable contact pad 109 from the first source contact pad 103. The second movable bar 110 rotates from the open position to the closed position to allow the second movable contact pad 111 at an end of the second movable bar 110 to engage the second source contact pad 105 at an end of the second source contact 104. The electrical load is electrically connected to the secondary power source. A similar operation is performed to transfer back to the primary power source from the secondary power source when the interruption is over. In some embodiments, the contacts pads 103, 105, 109, and 111 are made of one or more metals or metal alloys, such as a silver or copper alloy. It is noted that the load can be transferred using an "open transition" (where the first source is disconnected before the second is coupled, leaving the load briefly unpowered—"break before make") or a "closed transition" (where both sides of the switch are briefly closed at the same time and the sources are paralleled together to make the power transition seamless, but requiring synchronization of the sources—"make before break") using the ATS switch. It is further noted that the ATS can also parallel the two sources to the load by leaving both sides coupled or electrically isolate the load from the sources by opening both sides of the switch.

Some automatic transfer switches use an electromagnetic force (EMF) induced by an electrical current flowing through the switch to assist keeping together contacts that connect an electrical load to the power sources. For example, a "blow-on force" is the EMF force generated that biases the switch contacts towards one another and presses them together when current is flowing. The current in the switch needs to follow a proper path to generate and maintain the blow-on force.

Figure 2A:
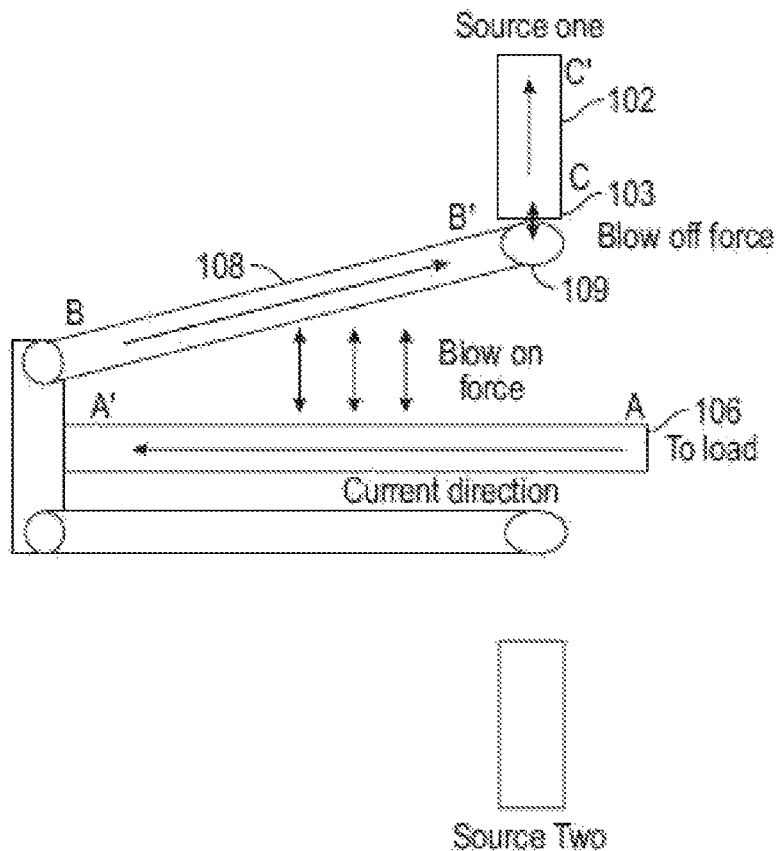
FIG. 2A is a schematic diagram of forces on a movable bar of the automatic transfer switch of FIG. 1 at a closed position.

Referring to FIG. 2A, schematic diagram of blow-on and blow-off forces on a movable bar of the automatic transfer switch of FIG. 1 is shown in a closed position. The current flow path is A-A' in the stationary bar 106, B-B' in the first movable bar 108, and C-C' in the first source contact 102. Since the current flow directions are opposite in the stationary bar 106 and the first movable bar 108, a repulsive electromagnetic force is induced that pushes the first movable bar 108 away from the stationary bar 106. This is the blow-on force that biases the first movable contact pad 109 towards the first source contact pad 103 and assists the closing force provided by the first spring and mechanical linkage 114.

Figure 2B:
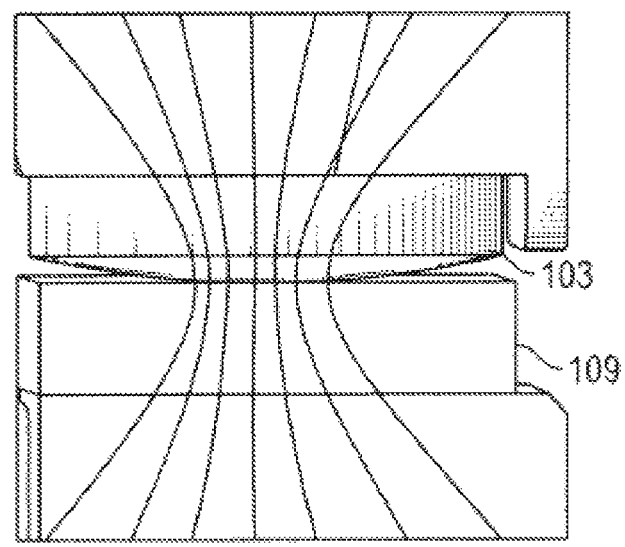
FIG. 2B is a schematic diagram illustrating current flowing through contacts of the automatic transfer switch of FIG. 1 at a closed position.

FIG. 2B illustrates current flowing through the first movable contact pad 109 and the first source contact pad 103. As shown, the in and out currents between the first movable contact pad 109 and the first source contact pad 103 are not on the same axis but form an angle. As a result, the in current and the out current induce a repulsive electromagnetic force between the first movable contact pad 109 and the first source contact pad 103 which pushes the first movable contact pad 109 away from the first source contact pad 103. This is a blow-off force that separates the contacts apart.

Referring back to FIG. 1, the cassette 100 may further include springs to help maintain a contact force during operation. As shown in the figure, the first spring and mechanical linkage 114 includes a spring 114a that pulls from the bottom of the first movable bar 108 and a spring 114b that presses on top of the first movable bar 108. The second spring and mechanical linkage 116 includes a spring 116a that pulls from the bottom of the second movable bar 110 and a spring 116b that presses on top of the second movable bar 110. It is noted that in some embodiments, springs 114a and 114b can be combined into a single spring 114, and so can springs 116a and 116b. In some embodiments, the first spring and mechanical linkage 114 and the second spring and mechanical linkage 116 each apply a contact force on the corresponding movable bar at the closed position.

Figure 3:
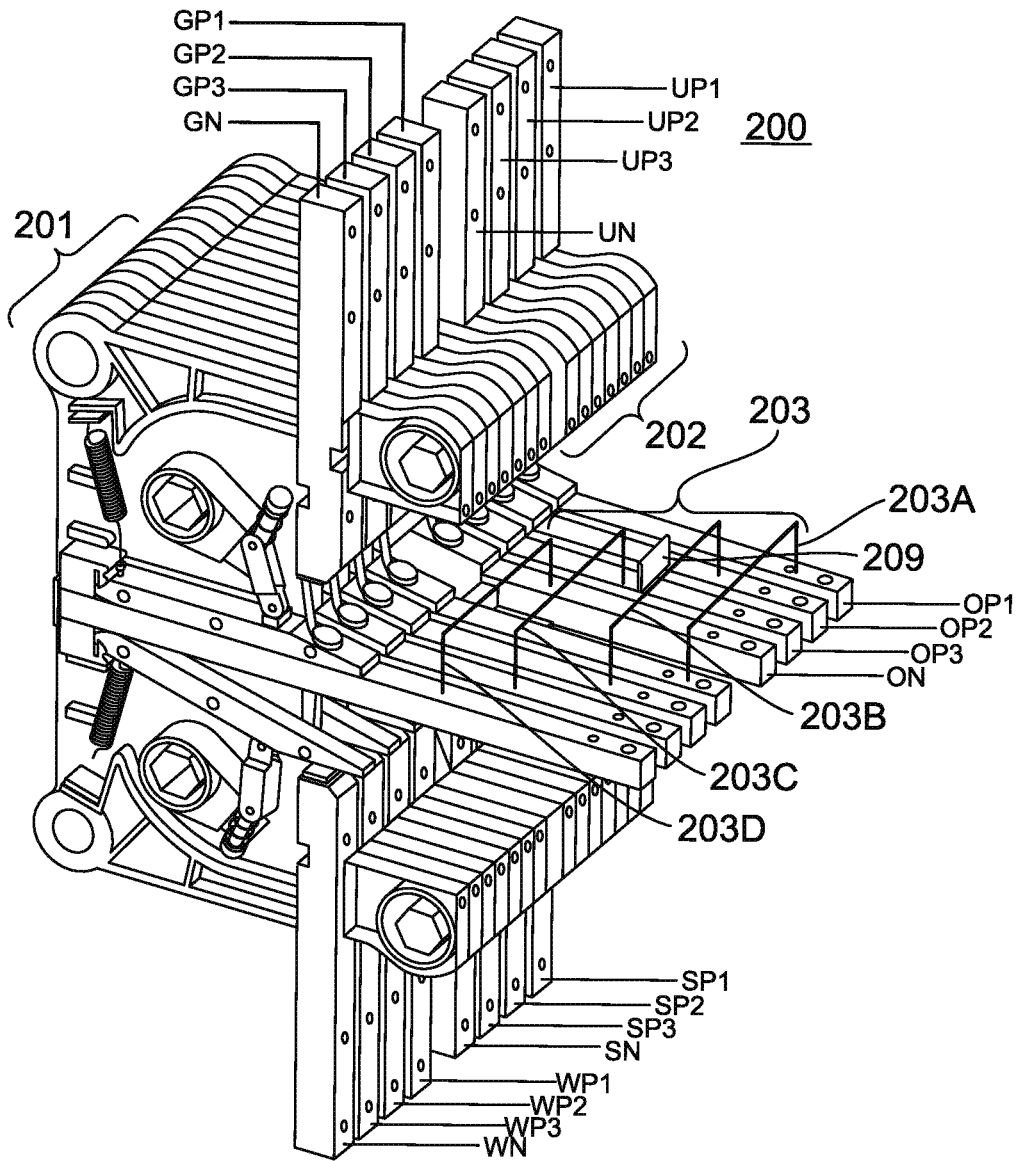
FIG. 3 is a schematic diagram of a four-way automatic transfer switch according to some embodiments.

FIG. 3 depicts a four-way automatic transfer switch utilizing jumpered connection and divided cassette groups and operating crossbars to provide four-way functionality according to some embodiments. As shown in FIG. 3, a four-way automatic transfer switch (ATS) 200 includes two groups of four of the cassettes 100. In particular, the four-way ATS 200 includes a first group 201 of four cassettes 100 and a second group 202 of four additional cassettes 100. Each of the cassettes 100 in the first and second groups 201, 202 may be positioned to route electrical power from an input thereof to an output thereof. Although FIG. 3 depicts the groups 201, 202 each including four cassettes, in some embodiments, each of the groups 201, 202 includes at least two cassettes. The groups are not limited to four cassettes. Further, in some embodiments, the groups 201, 202 may have a differing number of cassettes in accordance with a current carrying requirement. It is noted that other embodiments may have differing numbers or sizes of cassettes to enable differing number of phases, differing current carrying capacity, or different applications. It is also noted that in other embodiments, the number of cassettes can be different from side to side or cassette group.

In some embodiments, the ATS 200 may be configured as a one, two, or three-phase ATS, or may have still further phases, and the inputs may include any electrical power source such as utility, a solar power source, generator, an energy storage device, and a wind power source. The ATS 200 of FIG. 3 details a three-phase configuration of an embodiment with four source inputs, with each source input switching three phases and a neutral. It is noted that in the ATS 200, each group of four cassettes provides inputs for two three phase sources (three phases and a neutral) and the load outputs of the cassettes are jumpered with bus bar connections (203A-203D) together to provide a single three phase and a neutral output connection.

For example, the inputs may include (1) a first phase SP1 of a solar inverter, a second phase SP2 of a solar inverter, a third phase SP3 of a solar inverter, and a solar inverter neutral SN; (2) a first phase WP1 of a wind power source, a second phase WP2 of a wind power source, a third phase WP3 of a wind power source, and a wind power neutral WN; (3) a first phase GP1 of a generator set, a second phase GP2 of a generator set, a third phase GP3 of a generator set, and a generator set neutral GN; and (4) a first phase UP1 of a utility, a second phase UP2 of a utility, a third phase UP3 of a utility, and a utility neutral UN. Although a three-phase configuration is shown in FIG. 3, in some embodiments, the ATS 200 may be provided with a single phase configuration or a two-phase configuration. It is noted that other power sources and phase configurations are possible. For example, a single phase configuration may include either two switched poles per cassette group or a single switched pole per cassette group with an accompanied solid busbar for a ground or neutral connection.

Further, in at least one embodiment, the first group 201 of cassettes 100 may include the first through third generator set phases and the generator set neutral at the first source bar 102, and the first through third wind phases and the wind neutral at the second source bar 104. The second group 202 of cassettes 100 may include the first through third utility phases and the utility neutral at the first source bar 102 and the first through third solar inverter phases and the solar inverter neutral at the second source bar 104.

The ATS 200 may further include one or more actuators (operating mechanisms). In at least one embodiment, ATS 200 includes a plurality of actuators, which may be electromagnetic solenoids, for example. The actuators serve to drive the rotation of crossbars which are located through the perpendicular of the cassettes and in turn drive the rotation of cassette cams which rotate the cassette moveable bar. Traditionally, two crossbars are required, one across the top and bottom of the ATS cassettes, respectively, to drive the independent rotation of each of the two cassette movables. Multiple cassettes may be driven off of the same set of crossbars to coordinate the rotation of moveables across cassette groups. Multiple cassettes may be coupled together in parallel by phases within the ATS to carry sufficient current for the selected application.

In some embodiments, a first actuator (a first operating mechanism) is provided at an end of the first group 201 of cassettes 100, and a second actuator (a second operating mechanism) is provided at an end of the second group 202 of cassettes 100. The first actuator is configured to drive the first group 201 of cassettes, and the second actuator is configured to drive the second group 202 of cassettes. In some embodiments, a shaft connected to the first actuator and a shaft connected to the second actuator may be enlarged so as to accommodate driving of the cassette groups 201, 202, respectively.

In some embodiments, power may be routed from either set of inputs (i.e., the inputs from the generator set phases and the wind power phases, and the inputs from the utility phases and the solar inverter phases) of the groups 201, 202 of cassettes 100, respectively, to the outputs of the cassettes 100. Further, in some embodiments, connectors 203 may be employed to tie bus bars of the outputs together. The connectors 203 may be shorting bars or jumpers, for example.

Where shorting bars are provided as the connectors 203, they may serve to mitigate thermal effects due to eddy currents and the inherent resistance of the current carrying components such as busbars and cables by spreading the current flow of each of the phases across multiple conductors and cassettes. It is noted that in some embodiments, cables are generally flexible conductors having a conducting core that can be a solid conductor, multiple twisted strands, braided strands, or other flexible conductor form, whereas jumpers or shorting bars are generally rigid conductors having solid form for coupling between electrical connections or bus bars. In some embodiments, the shorting bars may be outfitted with a heat sink, such as a cooling fin 209, that may be molded onto the bars so as to absorb and dissipate heat from other parts of the ATS 200, e.g., from the stationary bar 106. The fin 209 may be made of highly conductive material so as to increase the amount of heat being conducted away from the ATS 200 through the fin.

By using the connectors 203 to tie the output bus bars together, an input power may be selected from any one of four sources to route to one set of electrical outputs. Further, the above-described configuration allows for any two sources to be paralleled, so that any of the sources can be paralleled with a smart grid, for example. Furthermore, in some embodiments, the configuration shown in FIG. 3 may be scaled so as to provide power from five, six, seven or eight sources to one load, for example.

In at least one embodiment, connectors 203 include four connectors. Specifically, a first connector 203A may connect a first output phase of the first group 201 of cassettes 100 to a first output phase of the second group 202 of cassettes 100. A second connector 203B may connect a second output phase of the first group 201 of cassettes to a second output phase of the second group 202 of cassettes. A third connector 203C may connect a third output phase of the first group 201 of cassettes to a third output phase of the second group 202 of cassettes. Finally, a fourth connector 203D may connect an output neutral of the first group 201 of cassettes to an output neutral of the second group 202 of cassettes.

Figure 5:
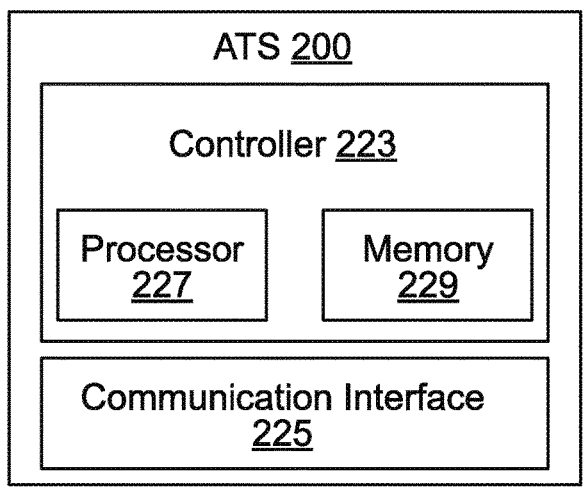
FIG. 5 is a schematic diagram of a controller according to some embodiments.

In some embodiments, the ATS 200 may be controlled by a control system or a programmable logic controller (PLC). Referring to FIG. 5, a schematic diagram of a control system is shown according to an exemplary embodiment. The ATS 200 may be coupled to the multiple sources and configured to switch a load therebetween, as discussed above. The ATS 200 includes a controller 223 and a communication interface 225, among other components. The controller 223 is configured to control the operations of the ATS 200 and facilitate load transfer among sources. The controller 223 may be implemented in various forms of hardware, firmware, special purpose processors, or a combination thereof. In some embodiments, the controller 223 is implemented on a computer platform having a processor 227 and a memory 229.

The processor 227 may be structured to selectively execute instructions, commands, and the like stored by the memory 229. The processor 227 may be implemented as a general-purpose processor, an application specific integrated circuit (ASIC), one or more field programmable gate arrays (FPGAs), a digital signal processor (DSP), a group of processing components like mentioned above, or any other suitable electronic processing components. The memory 229 (e.g., NVRAM, RAM, ROM, Flash Memory, hard disk storage, etc.) may store data and/or computer code for facilitating the various processes described herein. Accordingly, the memory 229 may be or include tangible, non-transient volatile memory or non-volatile memory.

The controller 223 may receive and transmit information from and to other devices via the communication interface 225 over a network. The communication interface 225 may include any communication interface appropriate or compatible with the network, such as a modem, a network interface card (NIC), a CAN bus, a mode bus, an Ethernet, a serial bus, a wireless transceiver, etc. In at least one embodiment, the controller 223 is programmed to control movement of the movable bars of the cassettes 100 of each of the cassette groups 201, 202 in the ATS 200 shown in FIG. 3, for example.

Furthermore, in at least one embodiment, the controller 223 may receive information relating to an operational state of one or more of a plurality of power sources (e.g., the utility, the genset, the wind power source, the energy storage device, or the solar inverter source). For example, the controller 223 may receive, via the network interface 225, information indicating that one or more of the sources is in a failed state or an operational state. The controller 223 may, in response to information from the network indicating that a power source is in a failed state, control the ATS 200 so as to switch to a non-failed (operational) power source. Similarly, the controller 223 may receive information indicating that one of the first group 201 of cassettes and the second group 202 of cassettes maintains power transmission upon failure of the other of the first group 201 of cassettes and the second group 202 of cassettes.

Figure 4:
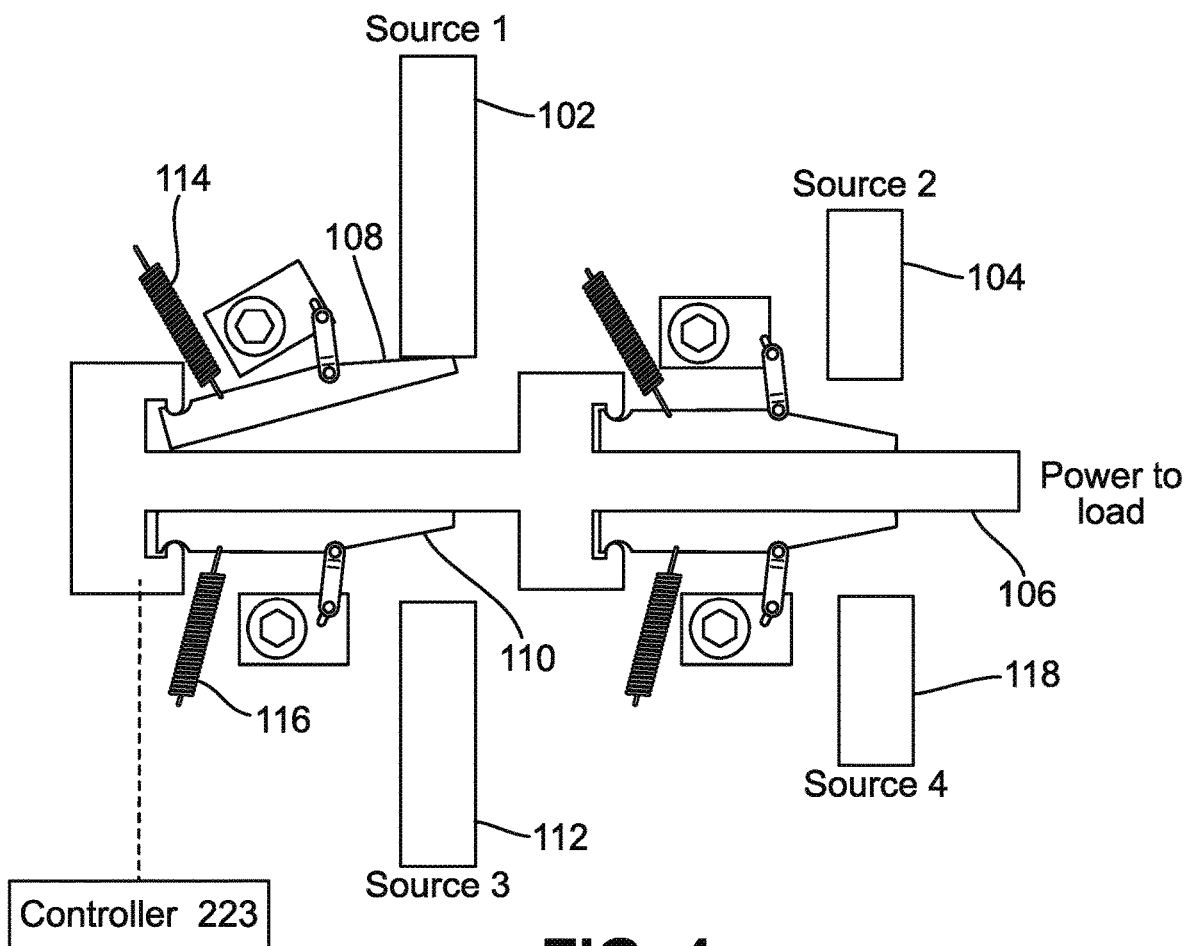
FIG. 4 is a schematic diagram of a configuration in which four sources may be connected to one load, according to some embodiments.

Referring now to FIG. 4, an exemplary ATS cassette configuration is shown in which four sources may be connected to one load with a front to back coupling of ATS cassettes to gain an increased number of source inputs, according to some embodiments. FIG. 4 shows a different configuration from FIG. 3. FIG. 3 depicts a four-way automatic transfer switch utilizing a jumpered stationary bar connection (e.g., via connector 203) or load output connection and divided cassette groups 201, 202, and operating crossbars to provide four-way functionality in a single layer of ATS cassettes. In contrast, FIG. 4 depicts two or more layers of ATS cassettes that have a common stationary bar or coupled stationary bars between the differing layers of ATS cassettes to provide additional source inputs with a single load output connection for the ATS switch. The configuration of FIG. 4 includes a stationary bar (e.g., a stationary bar shaped as a T-joint) 106 to which four sources 102, 104, 112, 118 are coupled. Each of the four sources may be coupled to a respective movable contact member in the manner described above in regard to FIG. 1.

Whereas the cassettes and cassette groups are located side-by-side in FIG. 3, the cassettes in FIG. 4 are located front-to-back, increasing the depth requirements of the electric cabinet containing the ATS switch, but allowing for a shorter connection distance on the load bus or stationary bar 106 and facilitating multiple source ATS operation. The ATS of FIG. 4 can also be used in a critical power redundant bypass configuration if source 1 102 and source 2 104 are coupled in parallel to a first power source, and source 3 112 and source 4 118 are coupled in parallel to a second power source. In at least one embodiment, the connection between the front and back cassettes in FIG. 4 is such that the cassettes can be disconnected, then one set at a time can be removed for test or service. While FIGS. 1-4 depict blow-on style ATS switches, non-blow-on ATS switches and cassette-based embodiments may be implemented. It is further noted that the four way side-by-side divided and jumpered cassette group ATS embodiment depicted in FIG. 3 can be combined with the four way front-to-back stationary bar and load connection embodiment of FIG. 4 to further increase the number of available source connections or to add bypass redundancy for critical power applications.

Furthermore, the T-joint 106 may be made longer so as to accommodate sources 1-4 (e.g., the utility, the genset, the wind power source, energy storage device, and the solar inverter source). The ATS may be connected in a wired or wireless manner to controller 223 discussed above. In some embodiments, in the above-described configuration, each of the first movable bar, the second movable bar, the third movable bar and the fourth movable bar associated with the respective sources 102, 104, 112 and 118 is movable by the associated rotating crossbars and mechanical linkage 114, 116 of the switch. In addition, in the blow-on ATS switch shown in FIG. 4, a blow-on electromagnetic force is present during operation so as to bias the respective first movable bar, second movable bar, third movable bar and fourth movable bar towards the first source bar, the second source bar, the third source bar and the fourth source bar, respectively, and the electromagnetic force is induced by current flowing through the stationary bar and the respective one of the first movable bar, the second movable bar, the third movable bar and the fourth movable bar.

Figure 6:
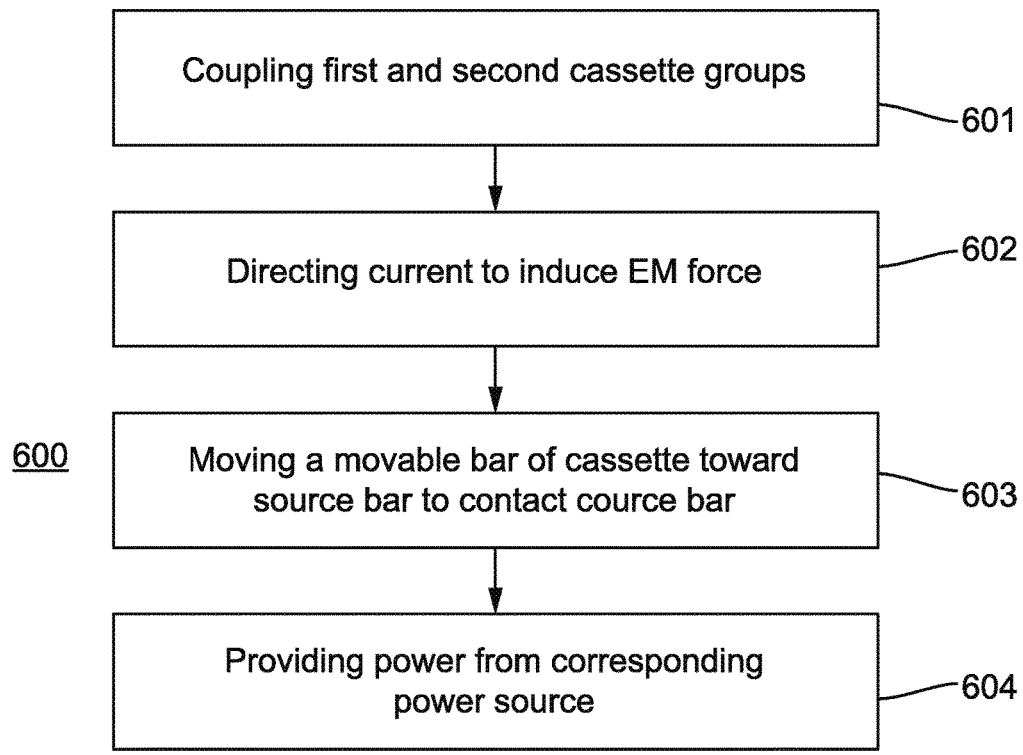
FIG. 6 is a process diagram depicting a method according to some embodiments.

Referring now to FIG. 6, a process diagram depicting a method 600 according to at least one exemplary embodiment is shown. The method includes coupling a first group of cassettes to a second group of cassettes (step 601), such as the first group 201 of cassettes and the second group 202 of cassettes described above in regard to FIG. 3. Each cassette of the first group 201 of cassettes and the second group 202 of cassettes includes a source bar structured to connect to a corresponding power source, and at least one movable bar electrically coupled and rotatably connected to a stationary bar, as shown in FIG. 3.

The method 600 further includes directing current to flow through the stationary bar and at least one movable bar of each cassette of the first group of cassettes or the second group of cassettes so as to induce an electromagnetic force (step 602), and causing the electromagnetic force to act on at least one movable bar of each cassette of the first group of cassettes or the second group of cassettes so as to move at least one movable bar toward the source bar of each cassette of the first group of cassettes or the second group of cassettes (603). As described above, the coupling includes connecting a stationary bar of the first group of cassettes to a stationary bar of the second group of cassettes. The coupling may be accomplished using a shorting bar or jumper for an electrical connection. Accordingly, such methods allow for the interconnecting of both blow-on and non-blow on ATS switches with side-by-side division using jumpers and divided rotating crossbars, or front/back division or placement so as to readily increase (e.g., multiply) the number of source connections for an ATS to couple a load to N possible sources.

Figure 7:
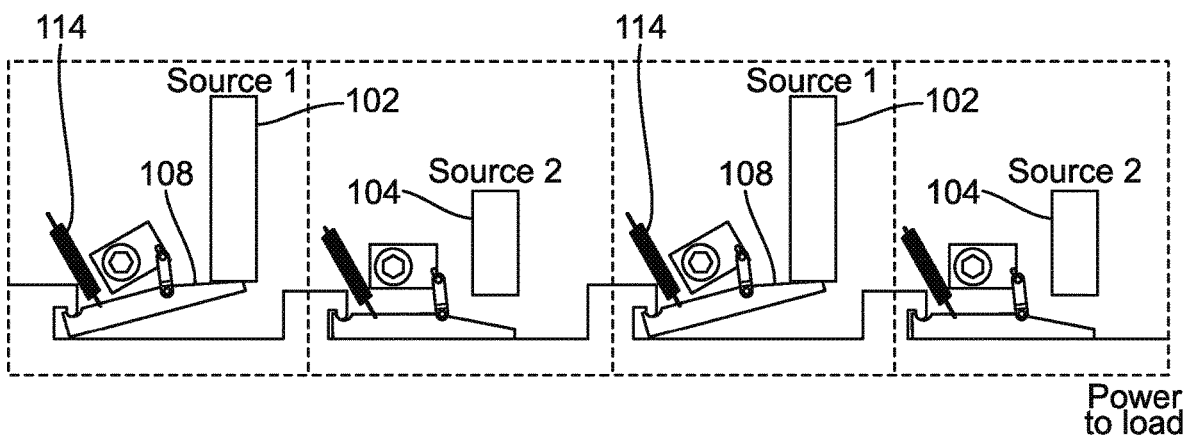
FIG. 7 is a schematic diagram showing multiple sources connected to a load, according to some embodiments.

Another configuration is shown in FIG. 7 and uses a low-profile half-cassette design as in U.S. patent application publication US 2017/0117104A1, but is connected either front-to-back or back-to-front to allow the connection of multiple sources. This scheme has the added advantage of always generating blow-on force regardless of the direction of current. The half-cassette locations are not limited to a horizontal orientation as a group or as individual cassettes, but can also be stacked vertically with a common load bus, with the load bus changing size as the cassette location requires. If the connections between the half cassettes are such that they can be disconnected, this configuration can also facilitate a bypass configuration where one or more half cassettes can be disconnected and removed for test or service. It is noted that the jumpered connection, side-by-side divided cassette groups and operating crossbars detailed in FIG. 3 can also be utilized in the low profile half-cassette embodiment of FIG. 7 to provide additional source inputs and functionality. In particular, at least one embodiment may include an automatic transfer switch cassette including four source bars being disposed on a same side as a stationary bar, and four movable bars electrically coupled and rotatably connected to the stationary bar and configured to contact one of the four source bars.

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in a particular order, this should not be understood as requiring that such operations be performed in the particular order shown or in sequential order, or that all operations be performed, to achieve desirable results. Moreover, the separation of various aspects of the implementations described above should not be understood as requiring such separation in all implementations, and it should be understood that the described methods can generally be integrated in a single application or integrated across multiple applications.

The construction and arrangements of the ATS systems as shown in the various exemplary embodiments, are illustrative only. Although only certain embodiments have been described in detail in this disclosure, many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As may be utilized herein, the term "about" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the drawings. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. A system comprising:
   a first group of one or more automatic transfer switch cassettes and a second group of one or more automatic transfer switch cassettes, each automatic transfer switch cassette comprising:
   a stationary bar having a first end and a second end parallel to the first end;
   a first source bar and a second source bar disposed on a first side of the stationary bar;
   a third source bar and a fourth source bar disposed on a second side of the stationary bar that is opposed to the first side;
   a first movable bar electrically coupled and rotatably connected to the stationary bar at the first side and configured to contact the first source bar; and
   a second movable bar electrically coupled and rotatably connected to the stationary bar at the first side and configured to contact the second source bar;
   a third movable bar electrically coupled and rotatably connected to the stationary bar at the second side and configured to contact the third source bar; and
   a fourth movable bar electrically coupled and rotatably connected to the stationary bar at the second side and configured to contact the fourth source bar;
   wherein the stationary bar of a first cassette of the first group of one or more automatic transfer switch cassettes is coupled to the stationary bar of a first cassette of the second group of automatic transfer switch cassettes, and the stationary bar of a second cassette of the first group of one or more automatic transfer switch cassettes is coupled to the stationary bar of a second cassette of the second group of one or more automatic transfer switch cassettes.

2. The system of claim 1, wherein:
   each of the first movable bar, the second movable bar, the third movable bar and the fourth movable bar is movable by an electromagnetic force biasing the respective first movable bar, second movable bar, third movable bar and fourth movable bar towards the first source bar, the second source bar, the third source bar and the fourth source bar, respectively, and the electromagnetic force is induced by current flowing through the stationary bar and the respective one of the first movable bar, the second movable bar, the third movable bar and the fourth movable bar.

3. The system of claim 1, wherein the second end of the stationary bar is structured to connect to an electrical load.

4. The system of claim 1, further comprising a programmable controller configured to control operation of each of the first movable bar, the second movable bar, the third movable bar and the fourth movable bar.

5. The system of claim 1, wherein the automatic transfer switch cassette is structured to connect to a utility grid.

6. The system of claim 1, wherein the first source bar and the second source bar are coupled in parallel to a first power source, and the third source bar and the fourth source bar are coupled in parallel to a second power source.

7. The system of claim 1, wherein the first source bar is coupled to a utility, the second source bar is coupled to a generator set, the third source bar is coupled to an energy storage device, and the fourth source bar is coupled to a solar inverter source.

8. The system of claim 1, wherein the automatic transfer switch cassette is arranged in an automatic transfer switch having one of a single-phase configuration, a dual-phase configuration, or a three-phase configuration.

9. The system of claim 1, wherein the stationary bar is structured as a T-shaped joint.

10. A system comprising:
a first group of one or more automatic transfer switch cassettes and a second group of one or more automatic transfer switch cassettes, each automatic transfer switch cassette in each of the first group and the second group comprising:
a stationary bar;
four source bars, each of the four source bars disposed on a same side of the stationary bar; and
four movable bars, each of the four movable bars electrically coupled and rotatably connected to the stationary bar and configured to contact one of the four source bars;
wherein the stationary bar of a first cassette of the first group of one or more automatic transfer switch cassettes is coupled to the stationary bar of a first cassette of the second group of automatic transfer switch cassettes, and the stationary bar of a second cassette of the first group of one or more automatic transfer switch cassettes is coupled to the stationary bar of a second cassette of the second group of one or more automatic transfer switch cassettes.

11. The system of claim 10, wherein the automatic transfer switch cassette is a half-cassette.

12. The system of claim 10, wherein each of the four movable bars comprises a first end and a second end, the first end being coupled to the stationary bar and the second end being configured to contact a corresponding one of the four source bars, and wherein each of the four movable bars is arranged such that the first end and second end are aligned in a first direction relative to the stationary bar.

13. The system of claim 12, wherein each of the four movable bars are arranged such that the first end and the second end are aligned in a second direction relative to the stationary bar, the second direction being opposite the first direction.

14. The system of claim 10, wherein a first pair of the four source bars are coupled in parallel to a first power source and a second pair of the four source bars are coupled in parallel to a second power source.

15. The system of claim 10, wherein the automatic transfer switch cassette is arranged in an automatic transfer switch having one of a single-phase configuration, a dual-phase configuration, or a three-phase configuration.

16. The system of claim 10, further comprising a programmable controller configured to control operation of each of the four movable bars.

17. The system of claim 16, wherein the programmable controller is configured to switch the automatic transfer switch cassette to an operational power source responsive to a determination that a power source has failed.

18. The system of claim 10, wherein:
the four movable bars comprises a first movable bar, a second movable bar, a third movable bar, and a fourth movable bar;
each of the first movable bar, the second movable bar, the third movable bar and the fourth movable bar is movable by an electromagnetic force biasing the respective first movable bar, second movable bar, third movable bar and fourth movable bar towards the first source bar, the second source bar, the third source bar and the fourth source bar, respectively, and
the electromagnetic force is induced by current flowing through the stationary bar and the respective one of the first movable bar, the second movable bar, the third movable bar and the fourth movable bar.

19. The system of claim 10, further comprising a second automatic transfer switch cassette connected to the automatic transfer switch cassette, the automatic transfer switch cassette being structured to be disconnectable from the second automatic transfer switch cassette to facilitate testing or service of the automatic transfer switch cassette.

20. The system of claim 19, wherein the automatic transfer switch cassette and the second automatic transfer switch cassette are arranged in a horizontal orientation within the system.

* * * * *